United States Patent [19]

Bramwell et al.

[11] 4,444,495
[45] Apr. 24, 1984

[54] METHOD AND APPARATUS FOR ALIGNMENT OF SPRAY NOZZLES IN CONTINUOUS CASTING MACHINES

[75] Inventors: Dwight W. S. A. Bramwell, Houston, Tex.; Herbert L. Gilles, Bethlehem, Pa.

[73] Assignee: Bethlehem Steel Corp., Bethlehem, Pa.

[21] Appl. No.: 258,340

[22] Filed: Apr. 28, 1981

[51] Int. Cl.³ .............................................. G01B 11/26
[52] U.S. Cl. ..................................... 356/138; 356/154
[58] Field of Search ............... 356/399, 138, 150, 153, 356/154

[56] References Cited
U.S. PATENT DOCUMENTS

| | | | |
|---|---|---|---|
| 3,528,748 | 9/1970 | Burch et al. | 356/138 |
| 3,612,700 | 10/1971 | Nelson | 356/153 |
| 3,615,138 | 10/1971 | Pedrotti et al. | 356/153 |
| 3,734,627 | 5/1973 | Edwards | 356/399 |
| 3,782,832 | 1/1974 | Hacskaylo | 356/138 |
| 3,854,820 | 12/1974 | Hansen | 356/399 |
| 3,897,637 | 8/1975 | Genho | 356/138 |

*Primary Examiner*—R. A. Rosenberger
*Attorney, Agent, or Firm*—John I. Iverson; John J. Selko

[57] ABSTRACT

Method and apparatus for aligning spray nozzles which have been disposed to apply a liquid coolant in a desired pattern on a target area. The invention includes the use of a light beam projected onto the target area to indicate any misalignment and the provision of means to adjust the spray nozzles so that the adjusted position results in a desired pattern of distribution of liquid coolant on a target area.

2 Claims, 9 Drawing Figures

U.S. Patent    Apr. 24, 1984    Sheet 3 of 3    4,444,495
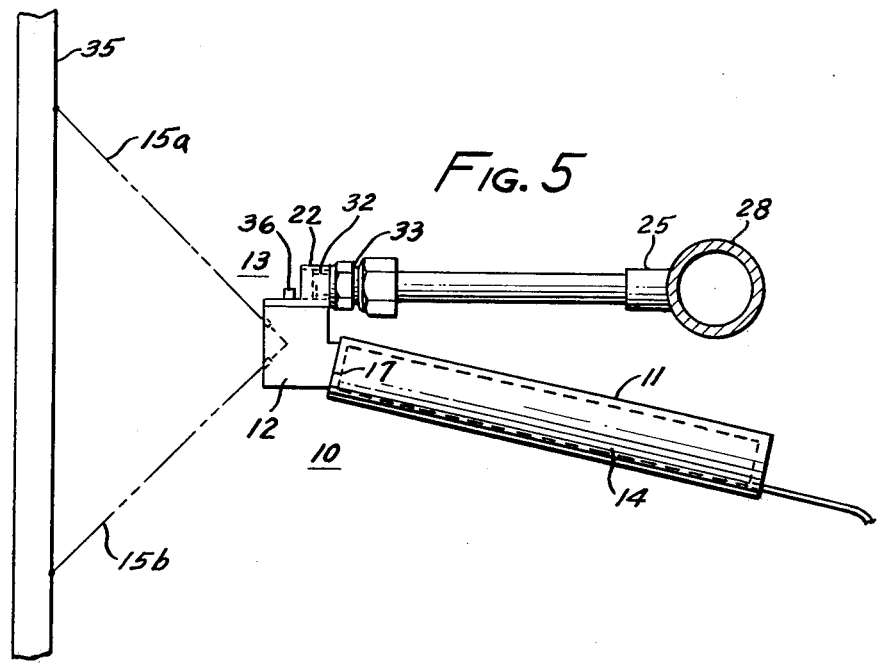
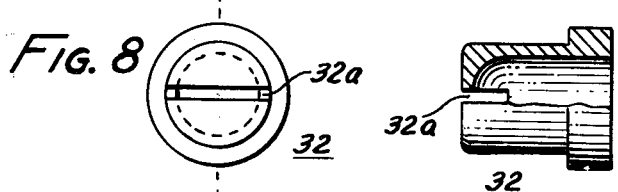
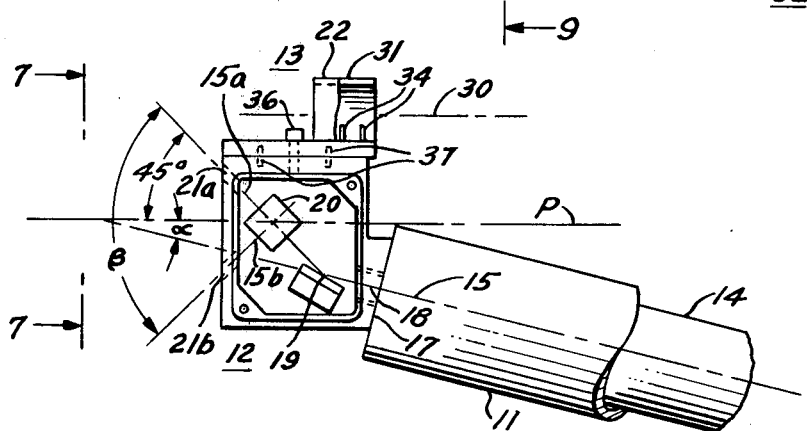
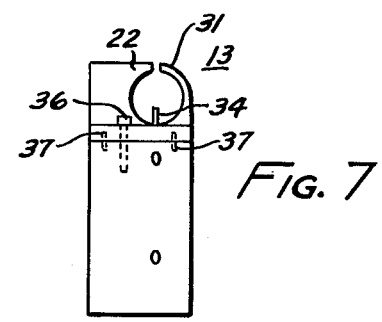

METHOD AND APPARATUS FOR ALIGNMENT OF SPRAY NOZZLES IN CONTINUOUS CASTING MACHINES

BACKGROUND OF THE INVENTION

The present invention relates to aligning apparatus and more particularly to a method and apparatus for aligning spray nozzles in operations wherein liquid coolant is sprayed from nozzles onto a workpiece.

In a continuous casting operation liquid metal is poured from a hot metal ladle into a tundish and then fed into a water cooled continuous casting mold. The strand formed thereby is continuously withdrawn from the mold. As the hot metal contacts the walls of the water cooled mold a thin skin forms to surround the molten core of the strand. As the strand is withdrawn from the water cooled mold it enters a secondary cooling zone where it is supported between a plurality of withdrawal rolls and additional heat is withdrawn to further solidify the cast strand.

In order to develop secondary cooling practices for making a high quality product, consistent and controlled application of spray coolant is required. Most of the variation in coolant application has been eliminated by providing sophisticated equipment, i.e. computer set point control, feedback flow control loops, and automatic computer checking of spray nozzle plugging and erosion.

However, alignment of the spray nozzles, which strongly affects spray cooling efficiency, is often crudely accomplished introducing unpredictable variations in the strand temperature profile. For example, when a segment is removed for repair or replacement of rolls, the spray nozzle header pipes often must also be removed. Handling and movement of the headers invariably results in movement of the nozzles from prior alignment positions. Also, when nozzles are plugged or eroded, replacement or cleaning requires realignment.

Alignment is critical in a continuous strand casting machine having single wide angle nozzles because of the large tip to strand distance, e.g. 24 inches, the narrow spacing between the rolls, on the order of 1.5 to 3.0 inches, and the width of the strand, e.g. 76 inches. Any misalignment of the spray nozzle will result in the coolant impinging the rolls instead of the strand supported between the rolls. The spray must be centered directly between the rolls for direct impact on the strand to insure maximum efficiency. This is also true where other spray shapes are utilized, e.g. square or full cone sprays.

A method currently used to align the spray nozzles in the secondary cooling zone of a continuous casting machine involves adjusting the sprays after they are turned on until the spray appears to be passing the maximum amount of water between the rolls. This method has obvious drawbacks, not the least of which is the drenching of the mechanic when making adjustments to nozzles which are overhead. The certain probability of becoming wet causes the alignment procedure to be a disliked job, done carelessly or not at all, or put at the bottom of the maintenance work list, and frequently left undone because of insufficient time.

SUMMARY OF THE INVENTION

It is, therefore, an object of this invention to provide a method and apparatus for accurately and efficiently aligning spray nozzles.

It is a further object of this invention to provide a simple and lightweight device for convenient attachment to and removal from each of a plurality of spray nozzles in the alignment thereof.

It is yet another object of this invention to provide apparatus for aligning spray nozzles while the spray nozzles are inactive.

The present invention accomplishes these objects by providing apparatus which includes a source of light, means for projecting a light beam from the source of light onto a target area and a clamping device mounted on the light-projecting means which is adapted for convenient attachment to and in alignment with the spray nozzles.

Other objects and advantages of the invention will appear from the following detailed description which, considered with the accompanying drawings, discloses a preferred embodiment of the invention for purposes of illustration only. For a definition of the scope of the invention, reference will be made to the appended claims.

BRIEF DESCRIPTION OF THE DRAWINGS

FIG. 5 is a detailed arrangement of the apparatus of the invention;

FIG. 6 is an enlarged fragmentary detailed portion of the apparatus of FIG. 5;

FIG. 7 is a view of the apparatus taken on line 7—7 of FIG. 6;

FIG. 8 is a front view of a wide angle spray nozzle tip; and

FIG. 9 is a view taken on line 9—9 of FIG. 8.

DESCRIPTION OF THE PREFERRED EMBODIMENT

Figure 1:
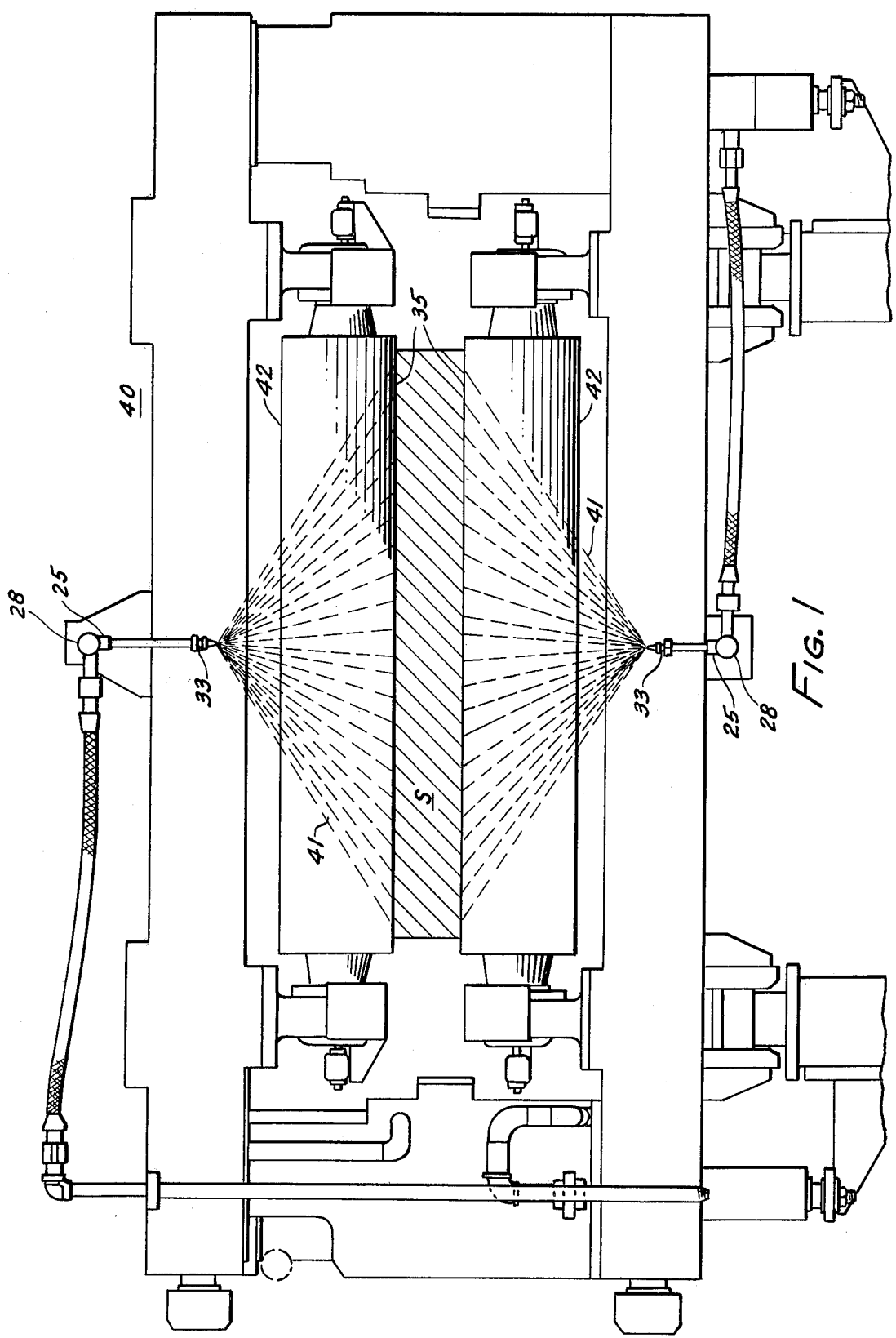
FIG. 1 is a sectional view of a typical installation serviced by the invention.
Figure 2:
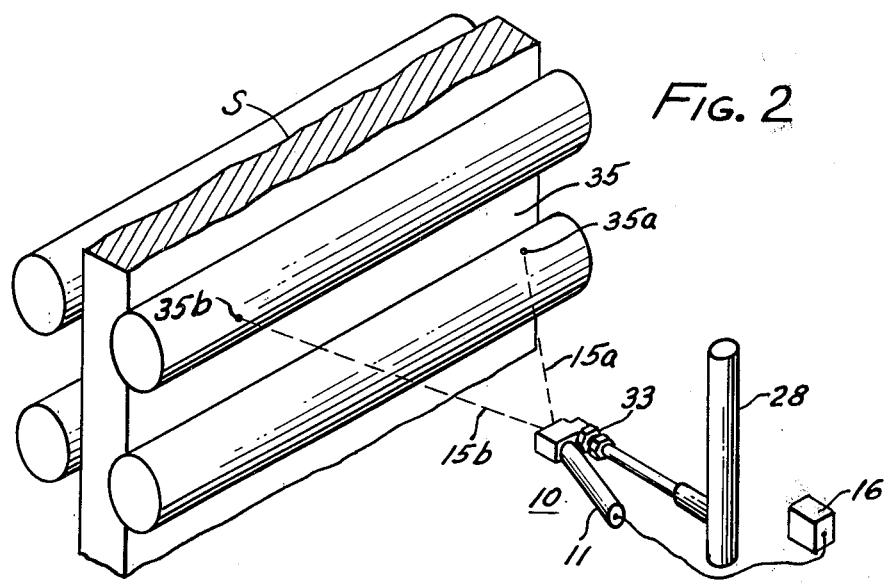
FIG. 2 is a schematic isometric view of one form of misalignment which can be corrected by the instant invention.
Figure 3:
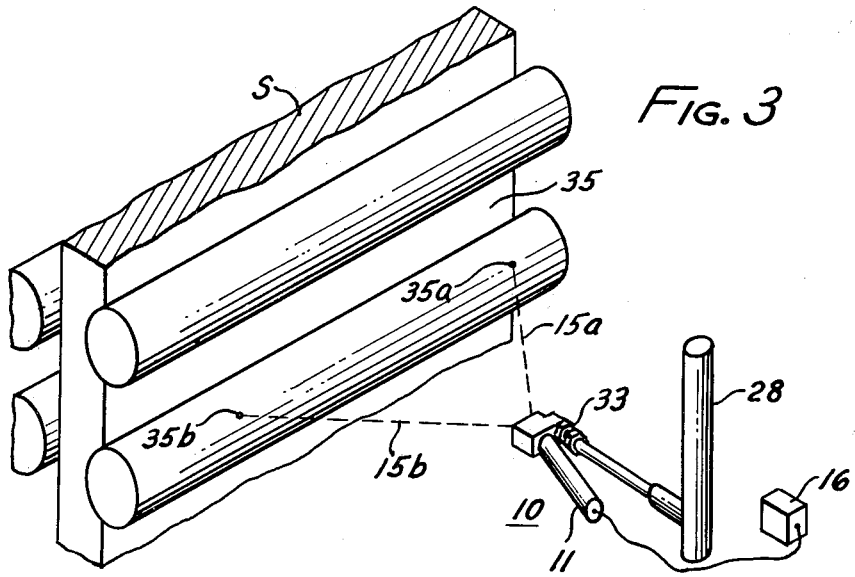
FIG. 3 is a schematic isometric view similar to FIG. 2 of another form of misalignment.
Figure 4:
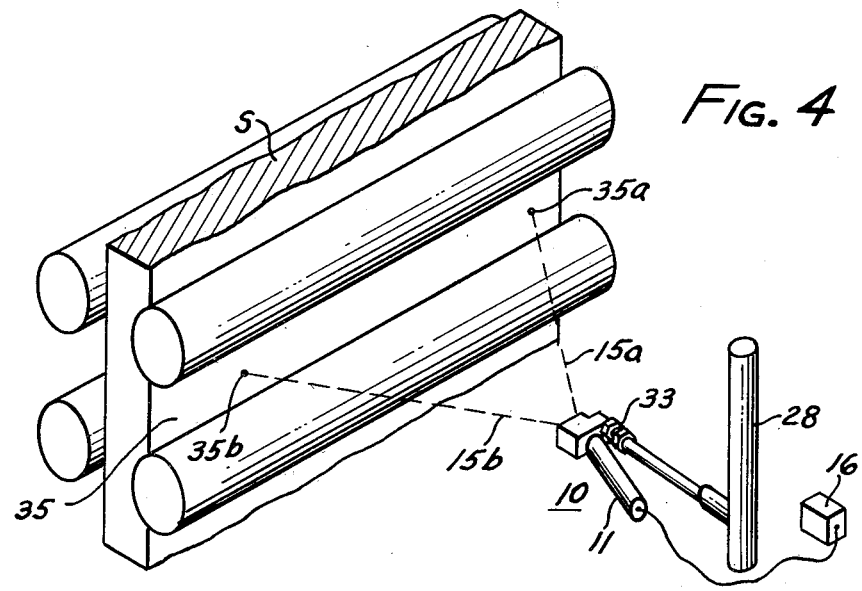
FIG. 4 is another schematic isometric view of a correctly aligned installation.

Refer now to the Figures for a detailed description of the invention. FIG. 1 is a sectional view of the withdrawal apparatus 40 of a continuous casting machine showing opposing wide angle sprays 41 directed through supporting rolls 42 to a continuously cast strand S. FIG. 2 is a schematic isometric view of one form of misalignment, i.e. the spray nozzle is rotationally displaced about its axis so that one side of the wide angle spray impacts on one support roll and the other side of the spray impacts on an adjacent roll with very little coolant sprayed on the continuous strand or target area. FIG. 3 is a schematic isometric view of another form of misalignment, i.e. the nozzle is deflected so that all of the spray impacts on one roll. FIG. 4 is another schematic isometric view showing the spray nozzle properly aligned so that when the coolant liquid is turned on, the wide angle spray will impact the continuous strand S or target area as desired.

The apparatus for aligning a spray nozzle which is disposed to apply liquid coolant on a target area will be discussed in detail. FIGS. 5 and 6 show an arrangement of the aligning apparatus 10 of the invention which includes generally, a laser protection tube 11 containing a sealed laser system 14, light beam projecting device 12 and clamping device 13. A sealed laser system 14 is provided within protection tube 11 and is powered by a low voltage source 16, e.g. power pack, D.C. power supply or by batteries. The sealed laser system 14 provides a uniform beam of light 15 which is directed into the light beam projecting device 12 where the beam of light 15 is split and projected in two beams, 15a and 15b, from the light beam projecting device 12 at a suitable angle $\beta$ to substantially embrace the extent of a wide angle spray onto a target area.

The light beam projecting device 12 is removably mounted on the end 17 of the laser tube 11 and is provided with an aperture 18 to admit the extension of light beam 15 into the beam projecting device 12 where the light beam 15 is deflected by front surface plane mirror 19 into a prism type beam splitter 20. The beam splitter may comprise any well known type of optical instrument for splitting a beam of light 15 into a plurality of beams of light, e.g. 15a and 15b. In the embodiment shown the beam splitter was made from two prisms formed into a cube.

Referring to FIG. 6 which is a detailed fragmentary portion of FIG. 5, the light beam projecting device 12 comprises a housing encasing front surface plane mirror 19, prism type beam splitter 20, aperture 18 to admit beam of light 15 from laser tube 11 and light ports 21a and 21b for projecting the beams of light 15a and 15b from the beam splitter onto a target area.

The clamping device 13 is removably mounted by screw 36 on one side of light beam projecting device 12 and comprises a tubular gripping device 22 having an axis in the plane of the beam of light 15 and beams 15a and 15b. Aligning pins 37 assure the proper alignment of the gripping device 22 with respect to the light beam projecting device 12. The two beams of light 15a and 15b, emitted through light ports 21a and 21b, respectively, define a plane with the centerline 30 of the tubular portion 31 of the gripping device 22. The tubular portion 31 is designed to embrace the tip 32 of spray nozzle 33 in clamping engagement therewith. The inside arcuate surface of the tubular portion 31 may be provided with pins aligned for engagement with the nozzle tip or other means to prevent movement of nozzle tip within tubular portion 31.

Referring with particularity to FIGS. 6 and 7, the tubular portion 31 of the gripping device 22 is split and is held secure to the spray nozzle tip by its spring force and fit. Two pins 34 located in the tubular portion of the gripping device 22 are positioned so that they will fit into the slot 32a of the spray nozzle tip 32, FIGS. 8 and 9. The purpose of these pins is to prevent rotation of the aligning apparatus 10 about the nozzle tip and to insure that the light beams 15a and 15b are in the same plane as the flow of coolant from the spray nozzle.

In Operation

Alignment of a spray nozzle is accomplished by simulating the plane of the coolant spray flow with two beams of light from a laser. A single laser source is used to produce a single beam of light 15 which is split to produce the two required beams 15a and 15b that define the plane. The single beam 15 enters the light beam projecting device 12, FIG. 6, in the spray plane at a small angle $\alpha$ to the line P which is parallel to and slightly displaced from the centerline 30 of the nozzle and also in the plane of the spray. The front surface plane mirror 19 deflects the beam 15, causing it to enter the prism type beam splitter 20 along one leg or beam 15a of the discharge angle $\beta$. The second leg 15b is produced by the beam splitter 20 and is displaced 90° from the first leg or beam 15a. The two beams 15a and 15b are symmetrical to the line P or axis of the beam splitter 20. Thus, the entry light beam 15 is converted into two beams 15a and 15b at a 90° angle simulating and in the same plane as the coolant spray flow.

The beams 15a and 15b are projected toward the target 35 and dots of light are produced on the target by the laser at the points where the beams are interrupted either by the target or by part of the machine structure. The operator observing the position of the dots can either rotate the nozzle tip slightly about its axis to align the dots on the target or if the dots are too low or too high, movement of the nozzle either up or down will adjust the dots to the desired target position. It will be clear to those skilled in the art that lateral adjustment can be made similarly.

SPECIFIC EXAMPLE

The following specific example describes in detail a typical application for the nozzle aligner 10 of the instant invention.

The rectangular cross-section of a continuous strand measuring 76 in. wide × 10 in. deep is seen in FIG. 1, which is a section through the secondary cooling zone of a continuous strand casting machine. The strand is supported between 15" dia. withdrawal rolls 42 having a body length of 80 in., which are spaced with a gap between the rolls of 2 inches. The coolant, water spray is a wide angle flat spray, produced e.g. by nozzle No. 31372514 manufactured by Spraco, Inc., Nashua, NH, which impinges the continuous strand S in a pattern described as a long and narrow elliptical impingement or target area. Water is supplied to the spray nozzle 33 through a 0.75 inch standard pipe connected through nipple 25 to a 1.5 inch header 28, FIG. 5, mounted on the roll support frame. In order to check the alignment of the spray nozzles so that they will produce the desired pattern of impingement on the strand the nozzle aligner 10 of the instant invention was applied to the inactive nozzles prior to the operation of the strand casting machine. The nozzles were inactive, i.e. no water was spraying from the nozzles.

The nozzle aligner apparatus 10 included a sealed laser system 14 which was powered by a 12 v DC power supply power pack 16. The power pack 16 was connected to a heliumneon water sealed laser, as e.g. class II Series Laser, Model No. 3209 H-C, manufactured by Hughes Aircraft Co., Carlsbad, CA, packaged in an aluminum cylinder 11, having a wall thickness 3/16 inch and which is 1 ¾ inches O.D. and 11 ¾ inches long. The sealed laser system 14 produced a concentrated beam of red light 15 which was projected through an aperture 18 in light beam projecting device 12 where the light beam was deflected by a front surface plane mirror 19 fixed in the device 12 in the path of the light beam 15. The deflected light beam was then projected through a prism type beam splitter 20 comprising two prisms formed into the shape of a cube. The beam splitter 20 divided the deflected beam of light into two separate beams 15a and 15b, one leg 15a in line with the deflected beam of light and the other leg 15b 90° thereto. The divided beam of light exited the beam projecting device through two light ports 21a and 21b.

The laser tube 11 and hence the laser beam 15 was designed to make a small angle $\alpha$ with the centerline or axis P of the beam splitter for convenience of handling the nozzle aligner 10 in close quarters. The relative placement of the mirror 19 and beam splitter 20 within the light beam projecting device 12 determines the angles $\alpha$ and $\beta$, the location of light beam ports 21a and 21b and the spread of the beam 15a and 15b legs for a given distance from the beam splitter 20 to the target area 35. The optical system will be well understood by those skilled in the art. Once this relationship is established the light beam projecting device 12 is assembled and cannot be adjusted without disassembling.

The gripping device 22, mounted on the light beam projecting device 12, has a slit tubular portion 31 the axis of which is coincident with the nozzle centerline 30. The tubular portion 31 was slipped onto the nozzle tip 32 and gripped the smooth nozzle tip 32 by virtue of the spring force and fit of the tubular portion 31 on the nozzle tip 32. In addition, two aligned pins 34 in the plane of the light beams 15a and 15b and nozzle centerline 30 were provided to fit into the horizontal slot 32a of the flat wide angle spray nozzle 32.

The nozzle aligner 10 was applied to a plurality of spray nozzles and the laser was energized to project two beams of light in the plane of the beams of light 15a and 15b and the spray nozzle centerline 30 onto the target area 35, which in this example was a dummy bar between the supporting withdrawal rolls 42. Observation of the position of the red dots 35a and 35b on the target area 35 if in substantial alignment or on other parts of the support roll structure if misaligned gave the operator of the nozzle aligner 10 information as to the desired alignment of the spray nozzle 33 with respect to the target area 35. If the red dots 35a and 35b both appeared on one roll it indicated that the nozzle should be raised or lowered so that the dots would appear on the target dummy bar in the space between the rolls 42. In the case where one dot appeared on one roll and the other dot appeared on an adjacent roll the nozzle tip needed only to be rotated slightly to bring the plane of the dots to a position in the space between the rolls.

The objective of the development of the method and apparatus described hereinabove was to obtain maximum, consistent water efficiency. Maximum efficiency will allow development of the best cooling practices. When efficiency changes, manual adjustment must be made to water rates or speeds must be changed causing a disruption to the operation and possibly causing a reduction in product quality.

This objective was accomplished by the simple and efficient method and apparatus of this invention for checking the alignment of spray nozzles in a continuous casting machine and quickly making necessary adjustments.

It will be apparent to those skilled in the art that various modifications may be made without departing from the spirit of the invention or the scope of the appended claims. There are many forms of spray nozzles to which the invention described herein is applicable, as e.g. full cone spray nozzles, square spray pattern nozzles, solid stream nozzles, special purpose nozzles, etc.

We claim:

1. Apparatus for alignment of a spray nozzle which is disposed to apply liquid coolant on a target area, comprising:
    (a) said spray nozzle having a nozzle tip with a slot therein for causing said liquid to flow along an axis of said spray nozzle in a wide angle flat spray plane,
    (b) a laser source of light energy,
    (c) light beam projecting means for projecting two light beams from the laser onto the target area in a plane which is the same as the spray plane of liquid coolant flow,
    (d) clamping device including a tubular member having an axis in the plane defined by the light beams and the spray nozzle axis mounted on the light beam projecting means for clamping onto the spray nozzle, whereby the plane defined by the light beams and the spray nozzle axis is the same as the spray plane of liquid coolant flow, and
    (e) spray nozzle adjusting means mounted on the clamping device.

2. Apparatus for alignment of spray nozzles according to claim 1
    wherein the light beam projecting means described in subparagraph (b) includes a front surface mirror and a beam splitter positioned to divide the light beam and project the resulting beams at angles symmetrical to the axis of the beam splitter.

* * * * *